United States Patent [19]

Essen

[11] 4,061,226
[45] Dec. 6, 1977

[54] THERMOMETER CASE AND HOLDER

[75] Inventor: R. Eric Essen, St. Louis, Mo.

[73] Assignee: Intec Industries Inc., St. Louis, Mo.

[21] Appl. No.: 699,531

[22] Filed: June 24, 1976

[51] Int. Cl.² .................... B65D 85/38; B65D 81/24
[52] U.S. Cl. .................................. 206/306; 206/212;
   220/259; 220/339
[58] Field of Search .................... 206/306, 305, 212;
   220/256, 259, 253, 339

[56] References Cited
U.S. PATENT DOCUMENTS

| | | | |
|---|---|---|---|
| 2,753,051 | 7/1956 | Tupper | 220/259 |
| 3,317,274 | 5/1967 | McCormick | 206/306 |
| 3,482,677 | 12/1969 | Small | 206/212 |
| 3,495,698 | 2/1970 | Draudt | 206/212 |
| 3,696,916 | 10/1972 | Penniman et al. | 206/212 |

Primary Examiner—William Price
Assistant Examiner—Douglas B. Farrow
Attorney, Agent, or Firm—Rogers, Eilers & Howell

[57] ABSTRACT

A thermometer case and holder for housing a thermometer for use in taking patient's temperatures, which case is of integral one-piece plastic construction and includes a container portion for containing alcohol and the like into which a major lower portion of the thermometer is inserted. Gripper means are provided at the lower end of the case for securing the bulb of the thermometer, and a hinged spacer lid is provided at the top of the container for centering the top of the thermometer, said spacer lid being operable between open and closed positions. A hinged cap fits over the spacer lid and an upward extension of the thermometer, and is also operable between open and closed positions. The case fits into a holder for mounting to a wall or the like.

15 Claims, 10 Drawing Figures

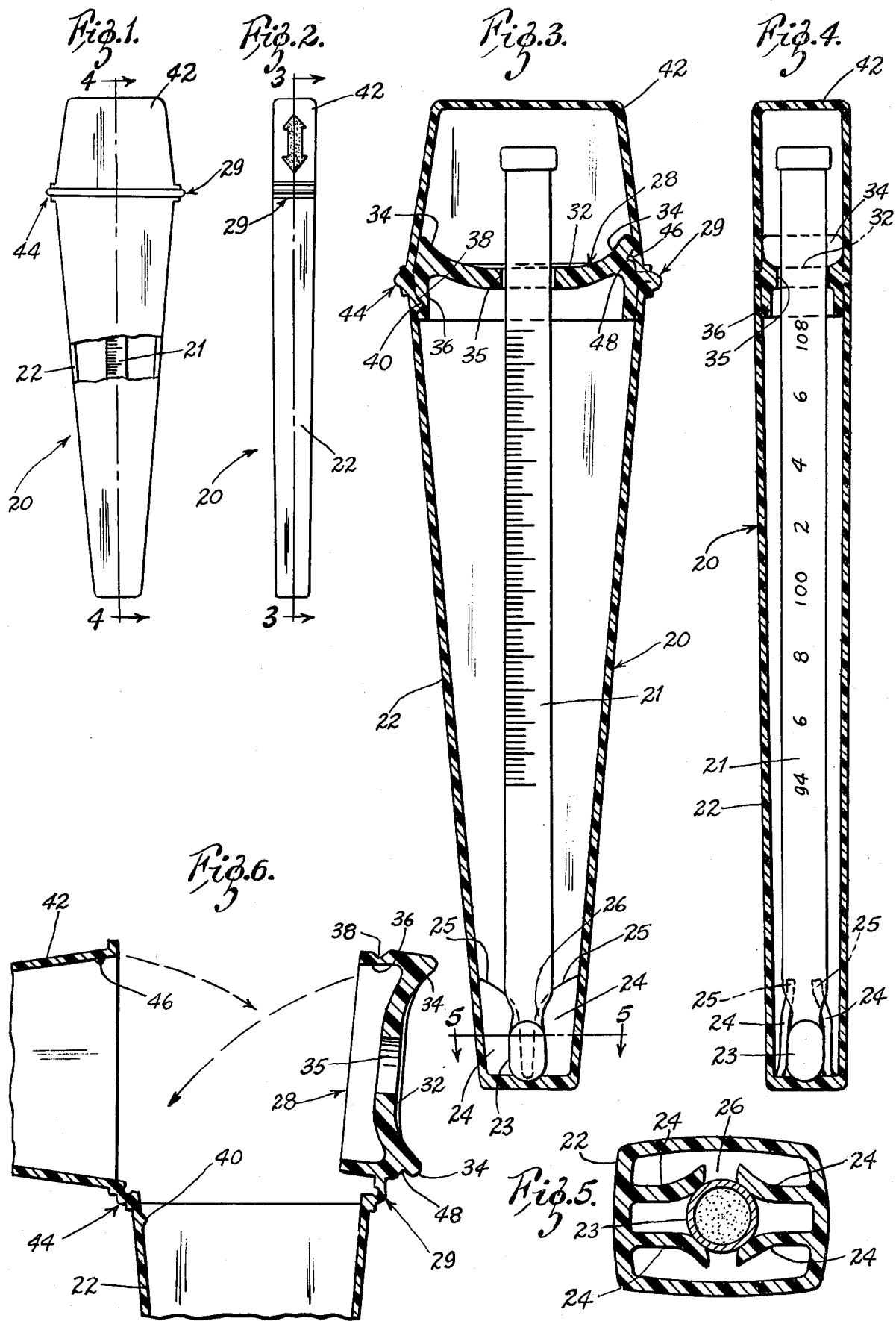

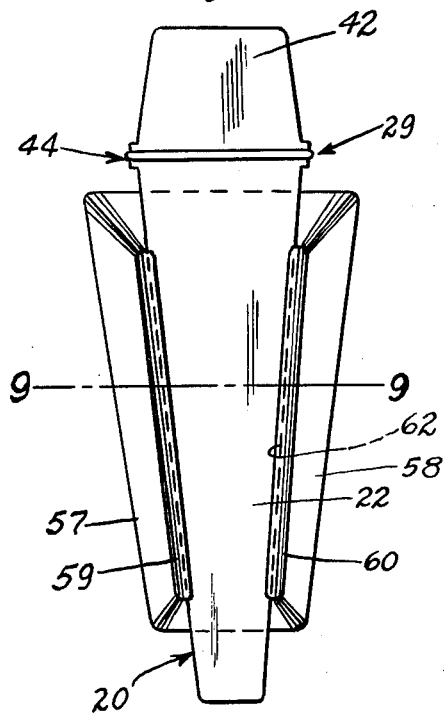
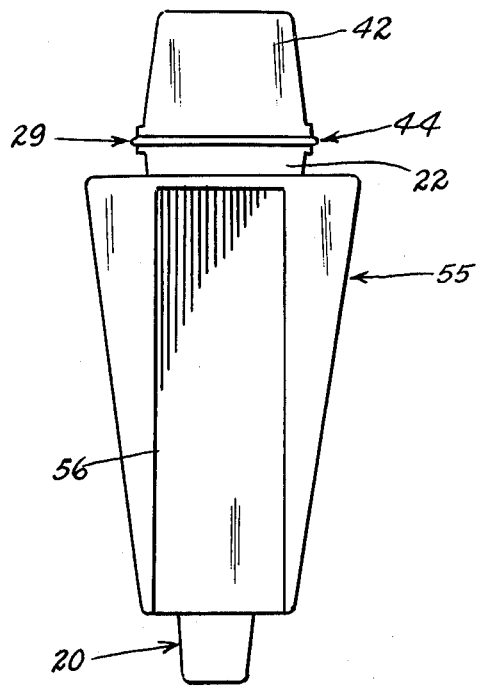
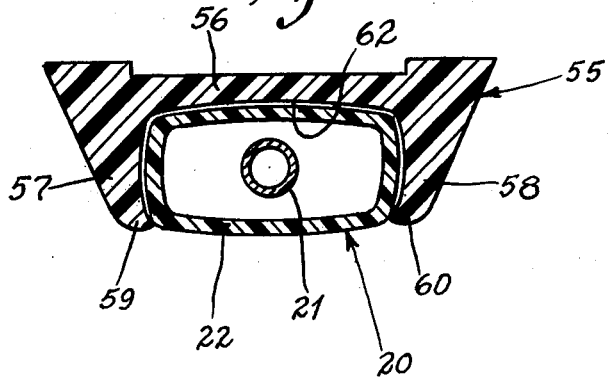
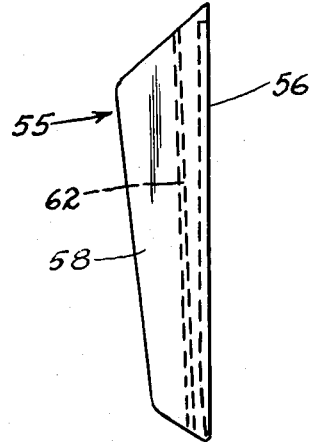

THERMOMETER CASE AND HOLDER

BACKGROUND AND SUMMARY OF THE INVENTION

This invention generally relates to a thermometer case and holder for use in housing thermometers of the type used for taking patient's temperatures such as in hospitals or other health care facilities. Cases of this general type have been known in the art and were developed to hold and protect thermometers that were issued to the various patients. Such cases are customarily filled with alcohol or some other disinfectant and kept at the patient's bed. In this way, a nurse is able to move from bed to bed taking temperatures with a patient's personal thermometer, thus eliminating the inconvenience of having to carry sterile thermometers with her when she makes her rounds.

The known thermometer cases of this general type have included an elongated container portion with some form of gripper device at the bottom for securing the bulb of the thermometer when placed therein, a spacer at the top for centering the top of the thermometer when placed therein, and a cap over the top of the thermometer for protection. Alcohol or the like is placed in the container by removal of the cap and spacer.

However, such prior art thermometer cases have certain disadvantages which have been eliminated by the improved thermometer case of this invention. With those cases known in the art, either the lid, or the spacer, or both, are unattached when removed or disengaged from the container portion, and have thus been susceptible to loss or misplacement, and posed problems of inconvenience in handling for the nurse or patient. These disadvantages have been overcome with the subject invention which provides a thermometer case of integral, one-piece plastic construction with both the spacer and cover permanently hinged to the container portion. Additionally, the novel design of this invention, and particularly that of the spacer itself, provides more ready access to the thermometer while maintaining a compact size and while further providing means for securing the cap in the closed position.

Generally, the thermometer case of this invention includes an elongated container portion for containing alcohol or the like and into which the major portion of a thermometer is housed when not in use. Grippers are located at the bottom of the container for securing the bulb portion of the thermometer. A spacer lid is located at the top of the container and is hinged along one edge to a top edge of the container for centering the thermometer near its top with a portion of the thermometer extending above the spacer. A cap fits over the upward extension of the thermometer and is also hinged along one edge so that it can be opened but not completely separated from the remaining portions of the case. The entire case, including the container, the spacer lid, and the cap are of integral, one-piece construction, and the spacer has a concave upper surface for easy access to the thermometer. In a preferred embodiment, the case is tapered for mounting in a holder having a correspondingly tapered pocket for support on a wall or the like.

Thus, the primary objects of this invention are to provide a thermometer case of the type generally described, which is of integral, one-piece construction, where all of the components of the case are permanently secured together, which provides easy access to the thermometer while maintaining a compact design, and which is readily mounted in a holder supported on a wall or the like. These and other objects of the invention are apparent from the drawings and detailed description to follow.

DESCRIPTION OF THE DRAWINGS

FIG. 1 is a front elevation view of a thermometer case of this invention with portions cut away;

FIG. 2 is a side elevation view of FIG. 1;

FIG. 3 is an enlarged view in section taken generally along the line 3—3 of FIG. 2;

FIG. 4 is an enlarged view in section taken generally along the line 4—4 of FIG. 1;

FIG. 5 is an enlarged view in section taken generally along the line 5—5 of FIG. 3;

FIG. 6 is a partial sectional view depicting the top of the case as shown in FIG. 3 with the spacer lid and cap in the open position;

FIG. 7 is a front elevation view of a thermometer case of this invention mounted in a holder;

FIG. 8 is a rear elevation view of the assembly of FIG. 7;

FIG. 9 is an enlarged view in section taken generally along the line 9—9 of FIG. 7; and FIG. 10 is a side elevation view of the holder.

DETAILED DESCRIPTION OF A PREFERRED EMBODIMENT

Referring to the drawing there is shown a thermometer case 20 of generally rectangular cross section as shown in FIG. 5 for housing a thermometer 21. The case 20 includes a container portion 22 for containing alcohol or the like and into which a major bottom portion of the thermometer 21 extends. The container portion is tapered as best shown in FIGS. 1 and 3 so as to be narrower at the bottom than at the top and has gripper elements 24 in the form of resilient ribs for engaging the bulb 23 of the thermometer and thereby securing the lower end of the thermometer against movement which might cause damage. The upper edges of the gripper elements 24 are tapered downwardly and inwardly as shown at 25 so that the bottom end of the thermometer "self-centers" into the central pocket 26 defined by the gripper elements as the thermometer is pressed downwardly into the container for engagement by the grippers.

A spacer lid 28 is located at the top of the container 22 and is hinged as shown at 29 along one of its narrow edges, to one of the top narrow edges of the container portion 22. The spacer lid has a concave upper surface 32 such that the center portion of the spacer lid is lower than those portions 34 near its narrow edges, its outer portions 34 projecting above the top of the container portion 22. The spacer lid 28 has a hole 35 at its center through which the thermometer 21 extends, the spacer lid thus serving to hold the top of the thermometer in a centered relationship within the case. The spacer lid further includes a rim 36 which extends somewhat downwardly into the container portion and which is generally contiguous with the walls of the container portion near the top. The rim 36 has a notch or groove 38 in the side opposite the hinge 29 which engages with a nib 40 in the side wall of the container portion 22 near the top to secure the spacer lid in the closed position.

A cap 42 fits over the spacer lid 28 and that portion of the thermometer which projects above the spacer lid. The cap 42 is hinged at 44 along one of its narrow edges to the top edge of the container portion 22 opposite the hinge 29. The cap 42 hs a nib 46 near the edge opposite the hinge 44 which engages a notch or groove 48 formed in the upwardly extending portion 34 of the spacer lid 28 adjacent the hinge 29 for securing the cap 42 in the closed position.

The entire case 20 including the housing portion 22, the grippers 24, the spacer lid 28, and the cap 42, as well as the hinges 29 and 44 and the nibs 40 and 46 are preferably of integrally molded, one-piece plastic construction.

As can be seen from the foregoing, to store the thermometer in the case, the spacer lid 28 is opened by pushing upwardly against the outer surface of the upwardly extending portion 34 opposite the hinge 29 and alcohol or the like is poured into the container portion 22. The spacer lid is then closed by engagement of the nib 40 with the recess 38. The thermometer 21 is placed in the case by inserting it through the hole 35 and pressing downwardly to engage the bulb end with the grippers 24. The cap 42 is then closed by engagement of the nib 46 with the recess 48.

To use the thermometer, the cap 42 is opened by pressing upwardly with the thumb on the outer surface of the cap opposite the hinge 44 thus disengaging the nib 46 from the recess 48. The thermometer is then simply removed by grasping the upwardly extending portion and pulling it upwardly out of engagement with the grippers 24 and out the hole 34 without disturbing the spacer lid 28. The grippers 24 are provided primarily to secure the thermometer during shipment and handling, and when the case is not in the holder. During normal use, as when the case is in the holder to be described, the thermometer need not be pressed into the grippers, and for such instances the cap 42 is made sufficiently high to clear the top of the thermometer when the cap is closed.

It can be seen that a sufficient portion of the thermometer must extend above the spacer lid so that it can be readily grasped for its removal. The concave design of the spacer lid provides greater access to the upper portion of the thermometer. It can also be seen that the amount of upward extension of the thermometer is limited by the fact that the hinged cap 42 when opened and closed must clear the top of the thermometer. Thus, to achieve the same degree of upward extension of the thermometer without the concave design of the spacer lid, so as to provide for locking engagement of the cap with the spacer lid above the hinge 29, would require that the casing be made wider at the top thus sacrificing the compact design of this invention. The concave design of the spacer lid allows easy access to the thermometer while maintaining a compact design together with a means for locking the cap to an upwardly extending portion of the spacer lid.

Referring to FIGS. 7 through 10 there is shown the thermometer case 20 mounted in a holder 55. The holder has a rear wall 56 for mounting to a flat surface wherever the thermometer is to be located, such as by the use of double-sided tape or the like. The rear wall 56 has tapered side walls 57 and 58 as shown which project forwardly therefrom and which turn slightly inwardly at their open ends 59 and 60, thereby defining a tapered pocket 62 which is open at the front, top, and bottom. The sides of the pocket and the case 20 are somewhat rounded in cross section as shown in FIGS. 5 and 9 to aid in holding the case in the holder. The taper of the pockets 62 is the same as the taper of the container portion 22 of the thermometer case 20. It will be noted that the depth of the pocket 62 is approximately equal to the case 20. The case is placed in the holder 55 by allowing it to drop into the pocket 62 whereupon it will fall to the position shown in FIGS. 7 and 8 with the cap 42 positioned above the top of the holder.

The holder 55, like the case 20, is preferably of molded, one-piece plastic construction.

Various changes and modifications may be made in this invention, as will be readily apparent to those skilled in the art. Such changes and modifications are within the scope and teaching of this invention as defined by the claims appended hereto.

What is claimed is:

1. A thermometer case assembly comprising an elongated container portion for containing the major lower portion of a thermometer, a spacer lid hinged along one of its edges to an upper edge of said container portion and sized for pivotal movement of the lid about the container edge between an open and a closed position over the container portion, said spacer lid having an aperture therethrough, and a cap having an opening through which the top of the thermometer projects into the cap with the cap closed, said opening being substantially greater in one cross-sectional dimension than another, said cap being hinged along one of its narrower side edges and sized with its greater cross-sectional dimension permitting pivotal movement between an open and a closed position overlying said spacer lid and the top of said container portion when the spacer lid is in the closed position and a thermometer is in the case with its upper end projecting above the top of the lid sufficient for grasping for ready removal from the case, the top of the container portion and the spacer also being substantially greater in one cross-sectional dimension than another, said narrow cross-sectional dimensions of the top of the container, spacer lid, and cap being substantially closer to the cross-sectional dimension of the thermometer than the other of said cross-sectional dimensions.

2. The thermometer case assembly of claim 1 further comprising gripper means integral with the container portion at the lower end of the container portion for gripping the bulb end of the thermometer when placed in the case.

3. The thermometer case assembly of claim 1 wherein said spacer lid has an upwardly extending portion along one of its edges, said cap locking means further comprising means associated with said cap for engagement with said upwardly extending portion of said spacer lid.

4. The thermometer case assembly of claim 3 wherein the upper surface of the spacer lid is generally concave with its center being lower than two opposite ones of its edges, one of said edges having said means thereon for locking engagement with said cap.

5. The thermometer case assembly of claim 1 wherein said spacer lid further includes a rim extending downwardly into said container portion, at least one side of said rim other than the hinged side of said spacer lid having said means for locking engagement with said container portion.

6. The thermometer case assembly of claim 1 wherein said spacer lid and said cap are hinged to opposite top edges of said container portion.

7. The thermometer case assembly of claim 2 wherein the tops of said gripper elements are tapered for self-centering of the lower end of a thermometer within said case upon pressing the thermometer into engagement with said gripper means.

8. The thermometer case assembly of claim 1 wherein said container portion is tapered to be narrower at its bottom than at its top.

9. The thermometer case assembly of claim 8 further comprising a holder, having a pair of walls projecting therefrom having a pocket therebetween, said pocket tapering downwardly and inwardly from its top for receiving said tapered container portion.

10. The thermometer case assembly of claim 1 wherein said container portion has a substantially flat exterior longitudinal surface for preventing rolling of the container when the said surface is placed on its side upon a substantially horizontal surface.

11. A case assembly for a thermometer comprising an elongated container portion for containing the major lower portion of the thermometer, said container portion having an opening at its upper end and a lower end to support the bulb end of the thermometer with the thermometer inserted within the container portion, a spacer lid hinged along one of its edges to an upper edge of said container portion sized for pivotal movement of the lid about the container edge between an open and a closed position over the container portion, said spacer lid having an aperture therethrough for allowing insertion of the thermometer into the container portion when the lid is closed over the container portion, the lid having a depending rim extending downwardly within the container portion when the lid is in the closed position, at least one side of said rim other than the hinged side of said lid having means for locking engagement with said container portion, and the spacer lid further having an upwardly extending portion along one of its edges, and a cap having an opening through which the top of the thermometer projects with the cap closed, said opening being substantially greater in one cross-sectional dimension than another, said cap being hinged along one of its narrower side edges to the container portion and sized with its greater cross-sectional dimension permitting pivotal movement between an open and a closed position over the top of the thermometer when the thermometer is in the case and projecting above the top of the lid sufficient for grasping for ready removal from the case to overlie said spacer lid when the lid is in a closed position and to overlie the top of said container portion, said cap having means for engaging the upwardly extending portion of the lid to lock the cap to the lid, the top of said container portion and said spacer lid aslo being substantially greater in one cross-sectional dimension than another, said narrow cross-sectional dimensions being substantially closer to the cross-sectional dimension of the thermometer than the other of said cross-sectional dimensions, said entire case including said container portion, said spacer lid and its hinge, and said cap and its hinge, being of integral one-piece plastic construction.

12. The thermometer case assembly of claim 1 wherein said cap has means for locking said cap in the closed position, and said spacer lid has means for locking said spacer lid in a closed position overlying the top of said container portion.

13. The thermometer case assembly of claim 1 wherein said entire case, including said container portion, said spacer lid and its hinge and said cap and its hinge being of integral one-piece plastic construction.

14. The thermometer case assembly of claim 1 wherein at least one pair of opposite side walls of said entire case with the spacer lid and cap in the closed positions defines substantially smooth, continuous surfaces.

15. The thermometer case assembly of claim 1 wherein said narrow cross-sectional dimension is approximately no more than half as great as any of said other cross-sectional dimensions.

* * * * *